United States Patent
Labrie

(10) Patent No.: US 8,356,617 B2
(45) Date of Patent: Jan. 22, 2013

(54) POPPET VALVE WITH DUAL FLOW AREA GAIN

(75) Inventor: Jason Labrie, Westfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 12/635,035

(22) Filed: Dec. 10, 2009

(65) Prior Publication Data

US 2011/0139254 A1 Jun. 16, 2011

(51) Int. Cl.
*F16K 1/32* (2006.01)

(52) U.S. Cl. .............. 137/1; 251/122; 251/205

(58) Field of Classification Search .......... 251/121, 251/122, 205, 282, 325
See application file for complete search history.

(56) References Cited

U.S. PATENT DOCUMENTS

| | | | | |
|---|---|---|---|---|
| 1,619,937 A | * | 3/1927 | Huff | 251/122 |
| 2,014,314 A | * | 9/1935 | Defenbaugh | 251/122 |
| 2,541,176 A | * | 2/1951 | Rockwell | 137/625.3 |
| 2,980,392 A | * | 4/1961 | Greenwood | 251/210 |
| 4,015,631 A | * | 4/1977 | Hayes | 137/625.33 |
| 4,793,589 A | * | 12/1988 | Eldredge et al. | 251/30.03 |
| 4,852,853 A | * | 8/1989 | Toshio et al. | 251/129.07 |
| 5,544,856 A | * | 8/1996 | King et al. | 251/129.08 |
| 6,293,514 B1 | * | 9/2001 | Pechoux et al. | 251/122 |
| 6,807,984 B2 | * | 10/2004 | Volovets et al. | 137/625.3 |
| 6,935,616 B2 | * | 8/2005 | Baumann | 251/282 |
| 2007/0040136 A1 | * | 2/2007 | Caprera | 251/122 |
| 2009/0057591 A1 | | 3/2009 | Izzy et al. | |

* cited by examiner

*Primary Examiner* — John Bastianelli
(74) *Attorney, Agent, or Firm* — Cantor Colburn LLP

(57) ABSTRACT

A poppet valve includes a housing having an inlet port and an outlet port. A poppet is located in the housing and includes a poppet body which blocks the outlet port when the valve is in a closed position and a poppet tip disposed at a distal end of the poppet body. The poppet tip includes at least one tip flow channel extending substantially along a poppet axis to meter flow therethrough as the valve is moved from a closed position. A method of controlling a flow includes translating a poppet located in a valve housing in a first direction along a poppet axis. At least one poppet flow channel extends across a valve inlet port via translation of the poppet. A fluid is flowed from the inlet port through a first flow area defined by the at least one poppet flow channel extending across the inlet port.

13 Claims, 4 Drawing Sheets

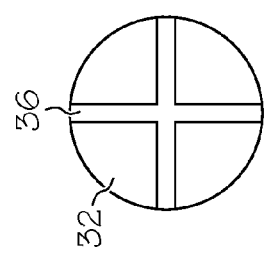
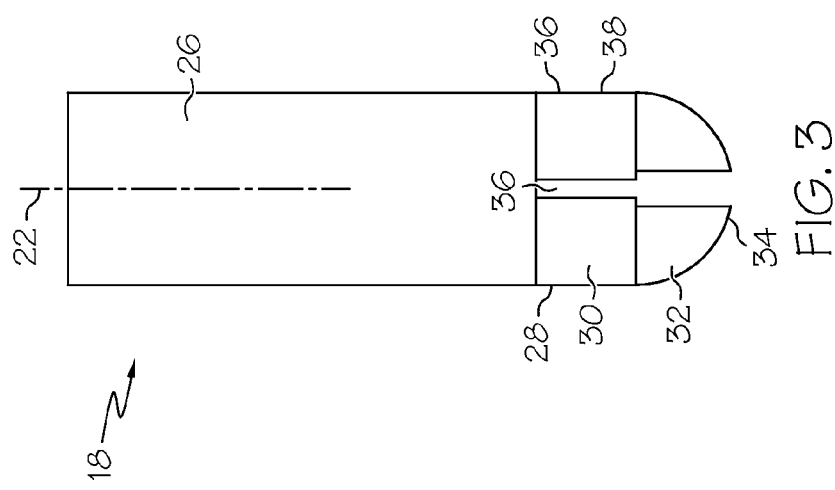

POPPET VALVE WITH DUAL FLOW AREA GAIN

BACKGROUND OF THE INVENTION

The subject matter disclosed herein generally relates to refrigeration and/or cooling systems. More particularly, the subject matter disclosed herein relates to valves for refrigeration and/or cooling systems.

Refrigeration and cooling systems typically use numerous valves throughout the systems to regulate flow therethrough. In particular, a Hot Gas Bypass Valve (HGBV) is utilized to allow a portion of a refrigerant flow to bypass the condenser of the refrigeration system. During low load conditions a low amount of refrigerant is bypassed, so there is a need for the HGBV to modulate over a range of small effective flow areas. When modulating refrigerant flow in this low load condition, it is necessary for the HGBV to have a very fine resolution in changing the effective flow area, thus a gain of the valve (the change in flow area for a given change in valve travel) is required to be small. In other operating conditions, however, it is desirable to bypass a larger portion of the refrigerant which requires the valve to modulate over a range of larger effective areas. In this operating range, it is often desirable to generate a large flow area quickly in order to minimize the valve stroke, overall valve size, weight, and slew rate, among other factors. Therefore a large gain is desired for this operational range of the valve.

BRIEF DESCRIPTION OF THE INVENTION

According to one aspect of the invention, a poppet valve includes a housing having an inlet port and an outlet port located therein. A poppet is located in the housing between the inlet port and the outlet port and includes a poppet body which blocks the outlet port when the valve is in a closed position and a poppet tip disposed at a distal end of the poppet body. The poppet tip includes at least one tip flow channel extending substantially along a poppet axis to meter flow therethrough as the valve is moved from a closed position.

According to another aspect of the invention, a method of controlling a flow through a valve includes translating a poppet located in a valve housing in a first direction along a poppet axis. At least one poppet tip opening located in the poppet is extended at least partially across a valve outlet port via translation of the poppet. A fluid is flowed from the inlet port through a first flow area defined by the portion of the at least one poppet tip opening extending across the outlet port.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 is a perspective view of an embodiment of a poppet for a poppet valve;

FIG. 3A is an end view of an embodiment of a poppet for a poppet valve;

The detailed description explains embodiments of the invention, together with advantages and features, by way of example with reference to the drawings.

DETAILED DESCRIPTION OF THE INVENTION

Figure 1:
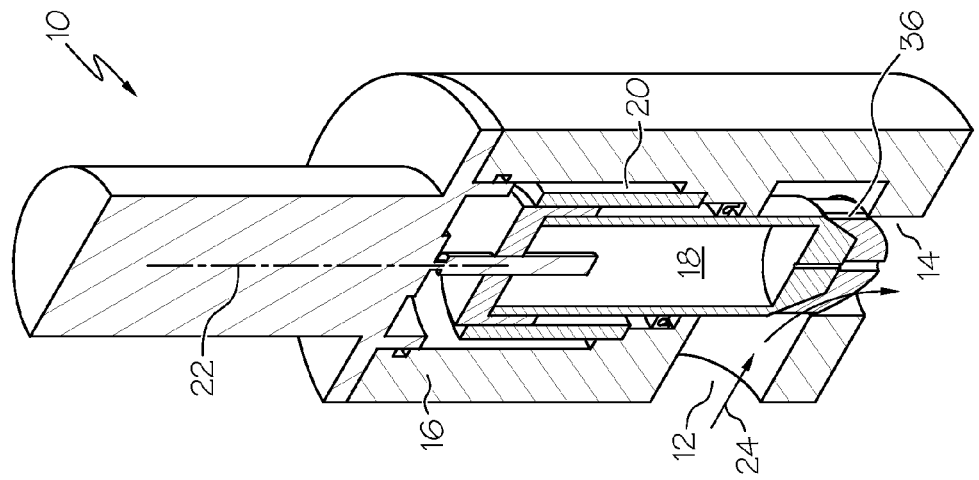
FIG. 1 is a cross-sectional view of an embodiment of a poppet valve.
Figure 2:
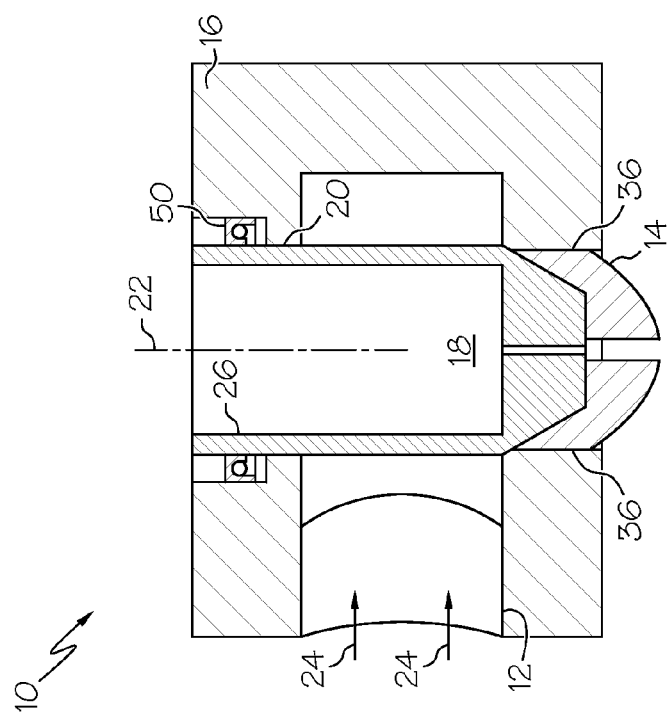
FIG. 2 is another cross-sectional view of an embodiment of a poppet valve.

Shown in FIG. 1 is an embodiment of a valve 10. The valve 10 includes an inlet port 12 and an outlet port 14 located in a valve housing 16. The inlet port 12 and outlet port 14 are substantially circular in cross-section, as shown in FIG. 2, but it is to be appreciated that other cross-sectional shapes are contemplated within the scope of the present disclosure. In some embodiments, the inlet port 12 and outlet port 14 are arranged perpendicular to each other. Referring again to FIG. 1, the poppet valve 10 includes a poppet 18 located in a cylinder 20 of the valve housing 16. The poppet 18 is translatable along a poppet axis 22 to regulate a flow 24 through the valve 10 via the inlet port 12 and the outlet port 14. In some embodiments, the translation of the poppet 18 is powered by a stepper motor (not shown). To prevent leakage of the valve 10 between inlet port 12 and outlet port 14 across a balancing pressure area, at least one ring seal 50 is disposed in the valve housing 16 surrounding the poppet 18.

The poppet 18 is configured to deliver two different flow area vs. valve stroke gains, and in some embodiments, both gains are linear. Referring to FIG. 3, the configuration of the poppet 18 is shown in more detail. The poppet 18 includes a poppet body 26 which, in some embodiments, is cylindrical in shape and sized to fit the cylinder 20. The poppet body 26 extends along the poppet axis 22 to a poppet tip 28.

The poppet tip 28 includes a primary section 30 which is substantially cylindrical and fits the cylinder 20. A secondary section 32, located at a distal end of the poppet 18 tapers from a cross-section matching the primary section 30 to a smaller cross-section at a tip end 34. The taper of the cross-section of the secondary section 32 may be curvilinear as shown or other configurations, for example, conical. The poppet tip 28 includes a plurality of tip openings 36. Each tip opening 36 extends along the poppet axis 22. The tip openings 36 shown in FIG. 3 are slots, but it is to be appreciated that other configurations, for example, notches in an outer wall 38 of the poppet tip 28, may be utilized. In some embodiments, the tip openings 36 extend to the tip end 34. Referring to FIG. 3A, and end view of the poppet tip 28 is shown. The tip openings 36 are slots, as stated above, arrayed around the poppet tip 28.

Figure 4B:
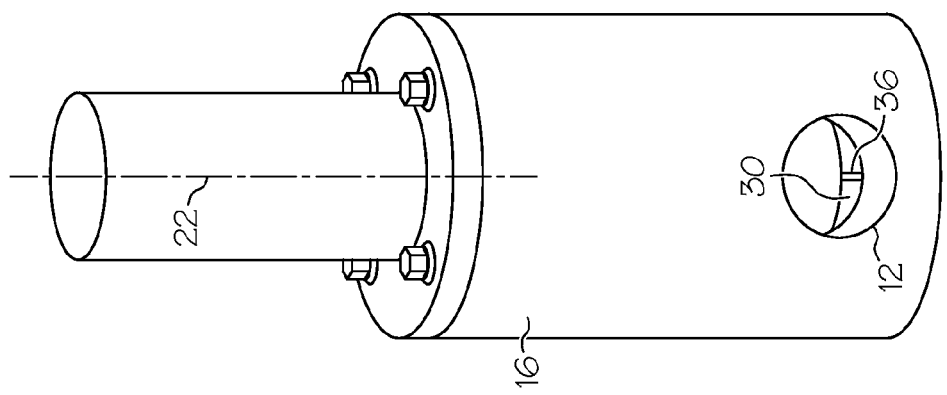
FIG. 4b is a perspective view of an embodiment of a poppet valve in a partially opened position.
Figure 4A:
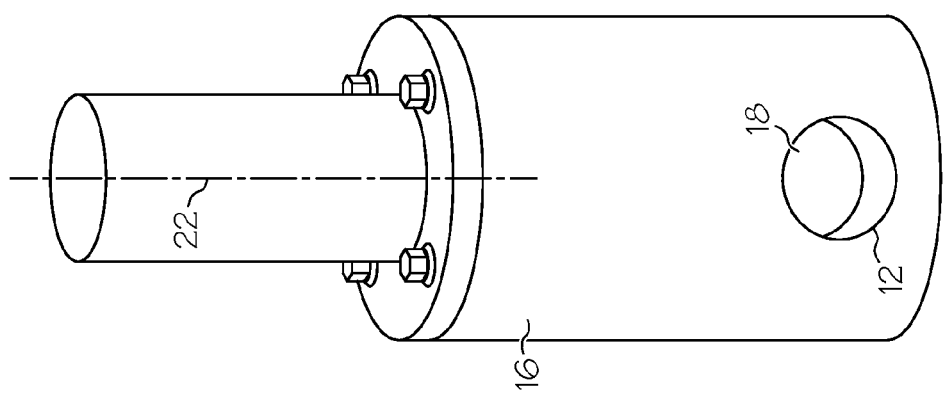
FIG. 4a is a perspective view of an embodiment of a poppet valve in a closed position.

Operation of the valve 10 will now be described in more detail. Referring again to FIG. 1, the valve 10 is illustrated in a closed position. The poppet 18 entirely blocks an incoming flow 24 from proceeding from the inlet port 12 to the outlet port 14. As shown in FIGS. 4a and 4b, as the valve 10 strokes, poppet 18 translates along the poppet axis 22. As the poppet 18 translates, the tip openings 36 extend from the inlet port 12 across the outlet port 14 and allow a portion of the flow 24 through the outlet port 14. As the poppet 18 translates, a portion of the tip openings 36 extending from the inlet port 12 across the outlet port 14 increases, thereby increasing the portion of the flow 24 allowed through the outlet port 14. In some embodiments, because of the shapes of the tip openings 36, an increase in a flow area (amount of the tip openings 36 extending across the inlet port 12) is linear with respect to poppet 18 movement along the poppet axis 22. Because a size of the tip openings 36 relative to the size of the outlet port 14 is small, the gain is small for this portion of the poppet 18 travel.

Figure 5A:
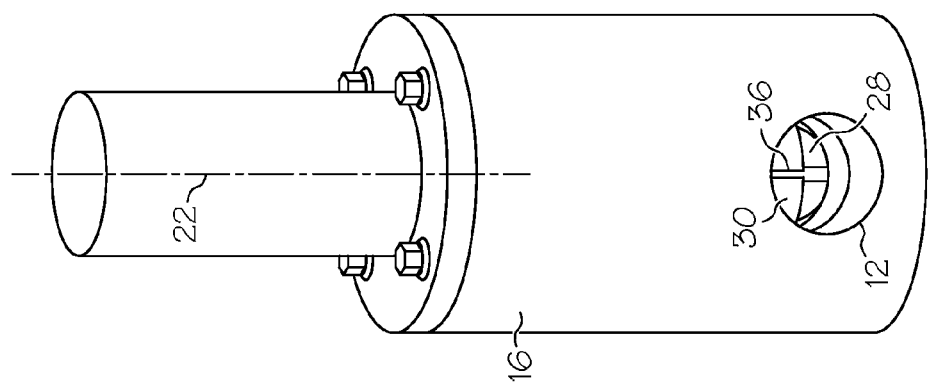
FIG. 5a is a perspective view of an embodiment of a poppet valve in a further partially opened position.
Figure 5B:
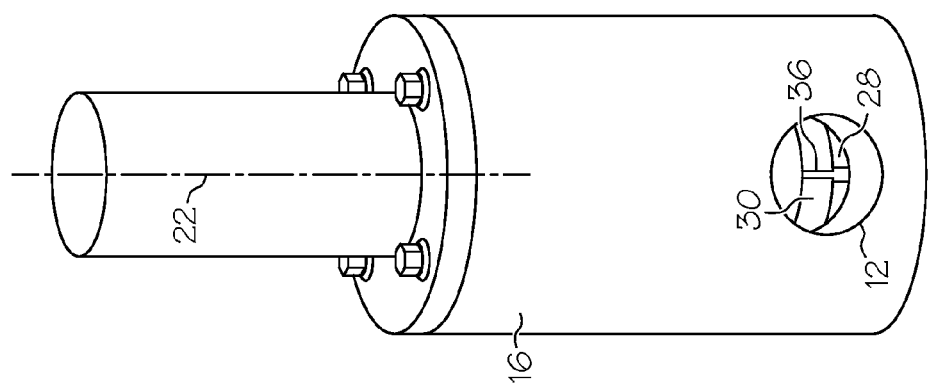
FIG. 5b is a perspective view of an embodiment of a poppet valve in a fully opened position.

In high flow conditions, as shown in FIGS. 5a and 5b, the primary section 30 of the poppet tip 28 moves out of the outlet port 14 opening up a much larger flow area. Again, in this portion of the poppet 18 movement, in some embodiments, the poppet 18 is shaped such that the flow area increases linearly with poppet movement 18. Since the poppet 18 movement, however, is opening a much larger flow area as shown in FIGS. 5a and 5b, the gain, or change in flow area per unit poppet 18 travel is large. Thus the valve 10 provides two different flow area versus valve stroke gains which, in some embodiments are linear.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of controlling a flow through a valve comprising:
    translating a poppet disposed in a valve housing in a first direction along a poppet axis;
    extending at least one poppet flow channel at least partially across a valve inlet port via translation of the poppet;
    flowing a fluid from the inlet port through a first flow area defined by the portion of the at least one poppet flow channel extending across the inlet port; and
    flowing the fluid through a second flow area defined by the poppet tip end and the inlet port
    wherein the at least one tip flow channel is formed in an exterior surface of the poppet and extends along the exterior surface from in a substantially cylindrical primary section of a poppet tip and through a tapered secondary section of the poppet tip to the poppet tip end.

2. The method of claim 1 wherein a size of the first flow area changes linearly per unit translation of the poppet along the poppet axis.

3. The method of claim 1 comprising further translating the poppet in the first direction along the poppet axis such that a poppet tip end is disposed at least partially across the inlet port.

4. The method of claim 1 wherein the second flow area is substantially greater than the first flow area.

5. The method of claim 1 wherein a size of the second flow area changes linearly per unit translation of the poppet along the poppet axis.

6. The method of claim 1 comprising flowing the fluid out of the valve via at least one outlet port.

7. The method of claim 6 wherein the outlet port is disposed at a substantially 90 degree angle from the inlet port.

8. The method of claim 1 comprising translating the poppet in a second direction substantially opposite the first direction to reduce flow through the valve.

9. A poppet valve comprising:
    a housing;
    an inlet port disposed in the housing;
    an outlet port disposed in the housing; and
    a poppet disposed in the housing between the inlet port and the outlet port including:
        a poppet body which blocks the outlet port when the valve is in a closed position; and
        a poppet tip disposed at a distal end of the poppet body including at least one tip flow channel extending substantially along a poppet axis to meter flow therethrough as the valve is moved from a closed position, a first flow area defined by the at least one tip flow channel and the inlet port and a second flow area defined by a poppet tip end and the inlet port, the at least one tip flow channel formed in an exterior surface of the poppet and extending along the exterior surface from in a substantially cylindrical primary section of the poppet tip and through a tapered secondary section of the poppet tip to the poppet tip end.

10. The poppet valve of claim 9 wherein the at least one tip flow channel is configured to change a valve flow area linearly as the poppet is translated along the poppet axis.

11. The poppet valve of claim 9 wherein the tip end is tapered curvilinearly.

12. The poppet valve of claim 9 wherein the first flow area through the at least one tip flow channel is substantially smaller than the second flow area past the tip end.

13. The poppet valve of claim 9 wherein the inlet port is disposed at a substantially 90 degree angle to the outlet port.

* * * * *